(12) United States Patent
Yan et al.

(10) Patent No.: US 10,766,636 B2
(45) Date of Patent: Sep. 8, 2020

(54) HOLDING APPARATUS

(71) Applicant: SZ DJI OSMO TECHNOLOGY CO., LTD., Shenzhen (CN)

(72) Inventors: Xin Yan, Shenzhen (CN); Xifeng Zhao, Shenzhen (CN); Guoqing Li, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/221,401

(22) Filed: Dec. 14, 2018

(65) Prior Publication Data
US 2019/0118972 A1    Apr. 25, 2019

Related U.S. Application Data

(63) Continuation of application No. PCT/CN2016/086266, filed on Jun. 17, 2016.

(51) Int. Cl.
| | |
|---|---|
| *B64D 47/08* | (2006.01) |
| *F16M 11/12* | (2006.01) |
| *B64C 39/02* | (2006.01) |
| *F16M 13/02* | (2006.01) |
| *F16M 13/04* | (2006.01) |

(52) U.S. Cl.
CPC ............ *B64D 47/08* (2013.01); *B64C 39/024* (2013.01); *F16M 11/12* (2013.01); *F16M 13/02* (2013.01); *F16M 13/04* (2013.01); *B64C 2201/127* (2013.01); *B64C 2201/146* (2013.01)

(58) Field of Classification Search
CPC ............................ G03B 15/006; G03B 17/563
See application file for complete search history.

(56) References Cited

U.S. PATENT DOCUMENTS

| | | | |
|---|---|---|---|
| 8,217,482 B2 * | 7/2012 | Basoor | G01S 7/4813 257/100 |
| 2006/0174812 A1* | 8/2006 | Marszalek | G08B 13/1481 116/4 |
| 2006/0233545 A1* | 10/2006 | Senba | G03B 17/14 396/529 |
| 2012/0192600 A1 | 8/2012 | Johnston et al. | |

(Continued)

FOREIGN PATENT DOCUMENTS

| | | |
|---|---|---|
| CN | 101318486 A | 12/2008 |
| CN | 101552911 A | 10/2009 |

(Continued)

OTHER PUBLICATIONS

The World Intellectual Property Organization (WIPO) International Search Report for PCT/CN2016/086266 dated Mar. 22, 2017 8 Pages.

*Primary Examiner* — Clayton E. LaBalle
*Assistant Examiner* — Leon W Rhodes, Jr.
(74) *Attorney, Agent, or Firm* — Anova Law Group, PLLC

(57) ABSTRACT

A holding apparatus includes a support base configured to hold an electronic device, a driving device configured to drive the support base, a detecting device configured to detect a mounting state of the electronic device, and a control circuit coupled to the detecting device. The control circuit is configured to receive a detection result from the detecting device and control a power output of the driving device according to the detection result.

23 Claims, 7 Drawing Sheets

(56) References Cited

U.S. PATENT DOCUMENTS

| | | | | |
|---|---|---|---|---|
| 2013/0010134 | A1* | 1/2013 | Motoki | G03B 15/05 |
| | | | | 348/207.99 |
| 2014/0063238 | A1 | 3/2014 | Abdollahzadeh et al. | |
| 2014/0368344 | A1* | 12/2014 | Grant | G08B 13/149 |
| | | | | 340/568.1 |
| 2015/0248145 | A1* | 9/2015 | Lee | G06F 1/1677 |
| | | | | 361/679.26 |
| 2017/0192478 | A1* | 7/2017 | Mercer | G06F 1/28 |
| 2017/0227162 | A1* | 8/2017 | Saika | H04N 5/2328 |

FOREIGN PATENT DOCUMENTS

| | | |
|---|---|---|
| CN | 102621995 A | 8/2012 |
| CN | 202392374 U | 8/2012 |
| CN | 102996984 A | 3/2013 |
| CN | 103593003 A | 2/2014 |
| CN | 103939718 A | 7/2014 |
| CN | 104076825 A | 10/2014 |
| CN | 203902845 U | 10/2014 |
| CN | 104386249 A | 3/2015 |
| CN | 204210394 U | 3/2015 |
| CN | 104781600 A | 7/2015 |
| CN | 204437648 U | 7/2015 |
| CN | 104865961 A | 8/2015 |
| CN | 104933964 A | 9/2015 |
| CN | 204650286 U | 9/2015 |
| CN | 105517902 A | 4/2016 |
| CN | 205186549 U | 4/2016 |
| CN | 105539872 A | 5/2016 |
| CN | 205263668 U | 5/2016 |
| CN | 105659020 A | 6/2016 |
| CN | 205311922 U | 6/2016 |
| CN | 205896622 U | 1/2017 |
| EP | 2759480 A1 | 7/2014 |
| KR | 100421422 B1 | 3/2004 |
| KR | 20130111044 A | 10/2013 |
| WO | 2009145401 A1 | 12/2009 |

* cited by examiner

HOLDING APPARATUS

CROSS-REFERENCE TO RELATED APPLICATION

This application is a continuation application of International Application No. PCT/CN2016/086266, filed on Jun. 17, 2016, the entire contents of which are incorporated herein by reference.

TECHNICAL FIELD

The present disclosure relates to support structure and, more particularly, to a method for controlling a holding apparatus, a holding apparatus, a hand-held gimbal, and an unmanned aerial vehicle (UAV).

BACKGROUND

In some application scenarios, a holding apparatus is needed for supporting a mobile phone, a camera, or another electronic device. The holding apparatus is provided with a driving device, which drives the electronic device to rotate so as to facilitate the adjustment of a shot angle. Sometimes the electronic device is needed to be detached from the holding apparatus while in the process of operating. However, because the holding apparatus is still in a running state, detaching the electronic device causes the driving device to be stalled, thereby resulting in an overload damage.

SUMMARY

In accordance with the disclosure, there is provided a holding apparatus including a support base configured to hold an electronic device, a driving device configured to drive the support base, a detecting device configured to detect a mounting state of the electronic device, and a control circuit coupled to the detecting device. The control circuit is configured to receive a detection result from the detecting device and control a power output of the driving device according to the detection result.

Also in accordance with the disclosure, there is provided a hand-held gimbal including a holding apparatus and a handle connected to the holding apparatus. The holding apparatus includes a support base configured to hold an electronic device, a driving device configured to drive the support base, a detecting device configured to detect a mounting state of the electronic device, and a control circuit coupled to the detecting device. The control circuit is configured to receive a detection result from the detecting device and control a power output of the driving device according to the detection result.

DESCRIPTION OF MAIN COMPONENTS AND LABELS

Figure 1:
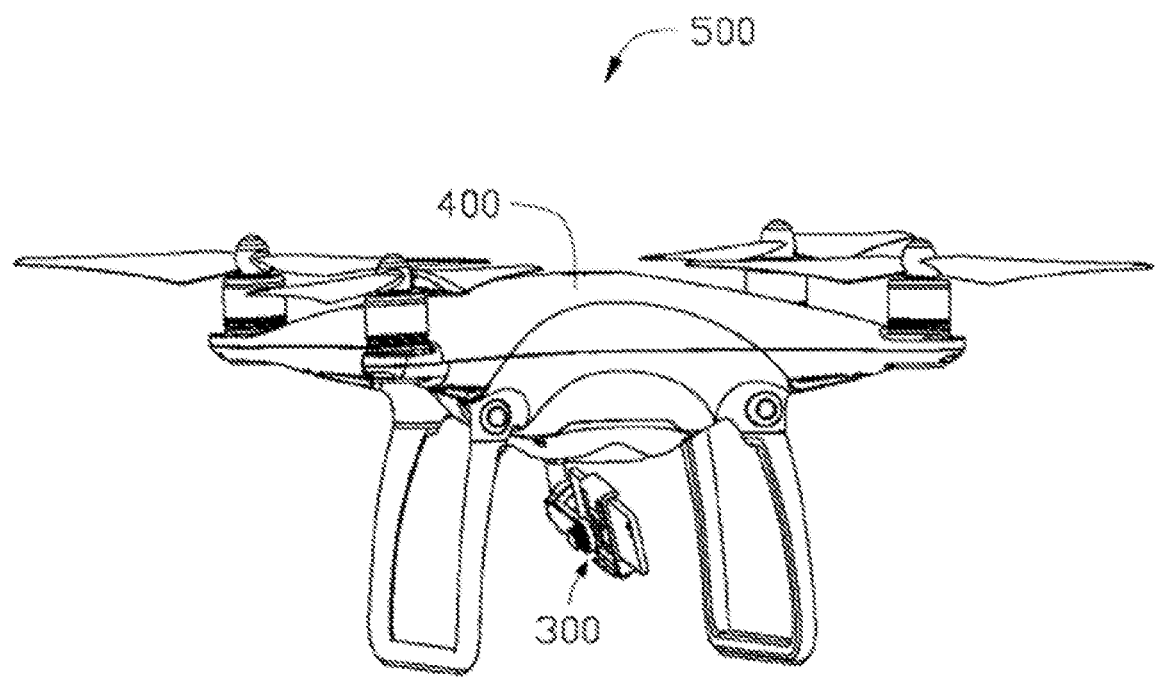
FIG. 1 is a schematic perspective view of an unmanned aerial vehicle (UAV) according to an exemplary embodiment of the disclosure.

UAV 500
fuselage 400
holding apparatus 300
electronic device 200
hand-held gimbal 100
support arm 10
support base 30
base body 31
rib 311
receiving groove 315
bottom wall 317
side wall 319
holding member 35
first holding member
locking member 37
connecting portion 371
locking portion 373
driving device 50
detecting device 81
sensing component 813
detecting component 815
control circuit 83
first rotation bracket 101
second rotation bracket 103
third rotation bracket 105
handle 106
control button 107
receiving portion 109

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

FIG. 1 shows an unmanned aerial vehicle (UAV) 500 consistent with the disclosure. As shown in FIG. 1, the UAV 500 includes a fuselage 400 and a holding apparatus 300 coupled to the fuselage 400. In some embodiments, the holding apparatus 300 may be provided under the fuselage 400. In some embodiments, the UAV 500 may also include other members or components not described herein, such as a power supply, a sensor, or the like. In FIG. 1 and the disclosure hereinafter, a UAV is depicted and described as an example. The present disclosure is not limited to the UAV, but can be applicable to another vehicle that includes a holding apparatus. For example, the vehicle may be a driverless boat or a self-drive car.

Figure 2:
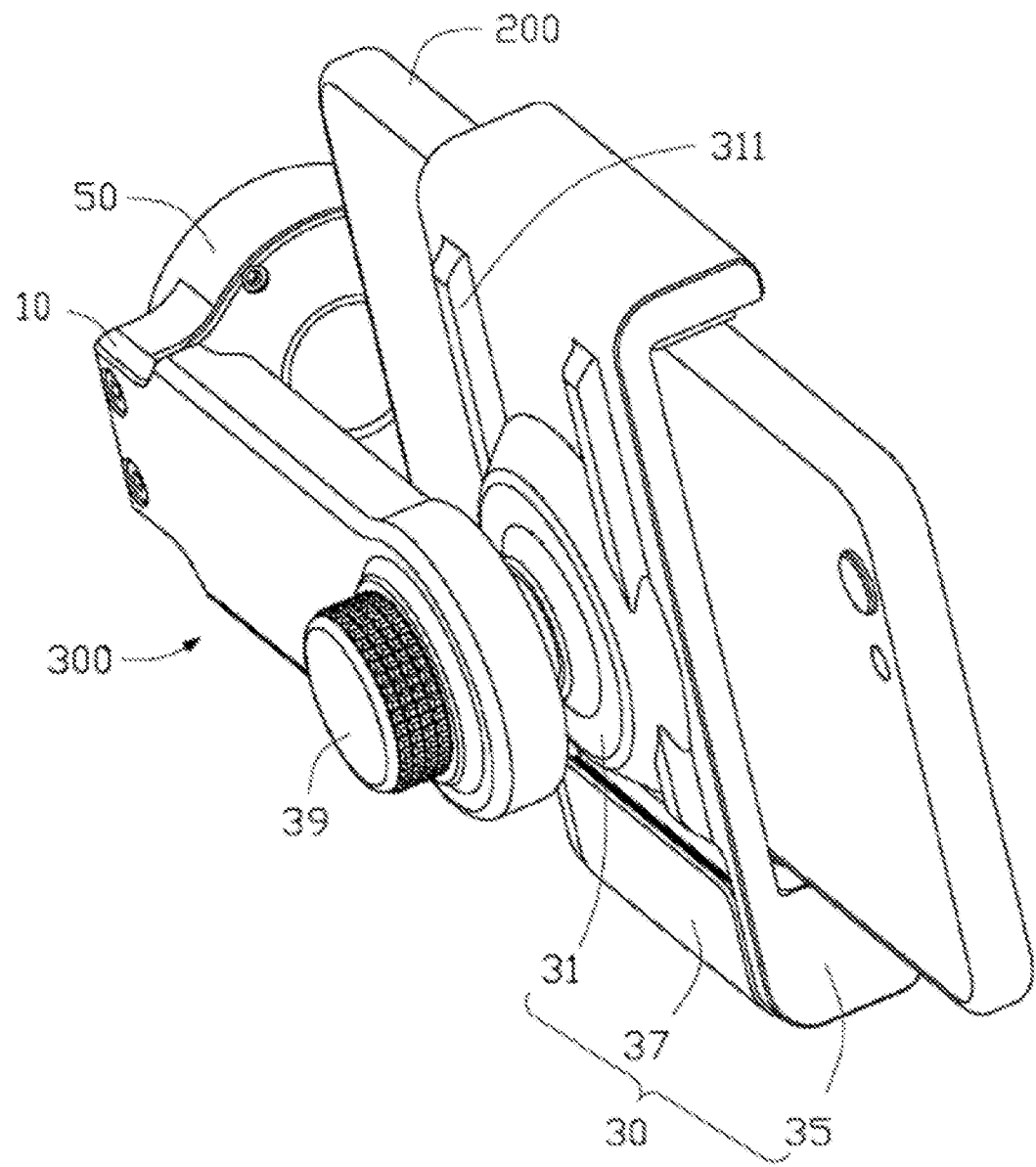
FIG. 2 is a schematic perspective view of a holding apparatus in a locked state according to an exemplary embodiment of the disclosure.
Figure 3:
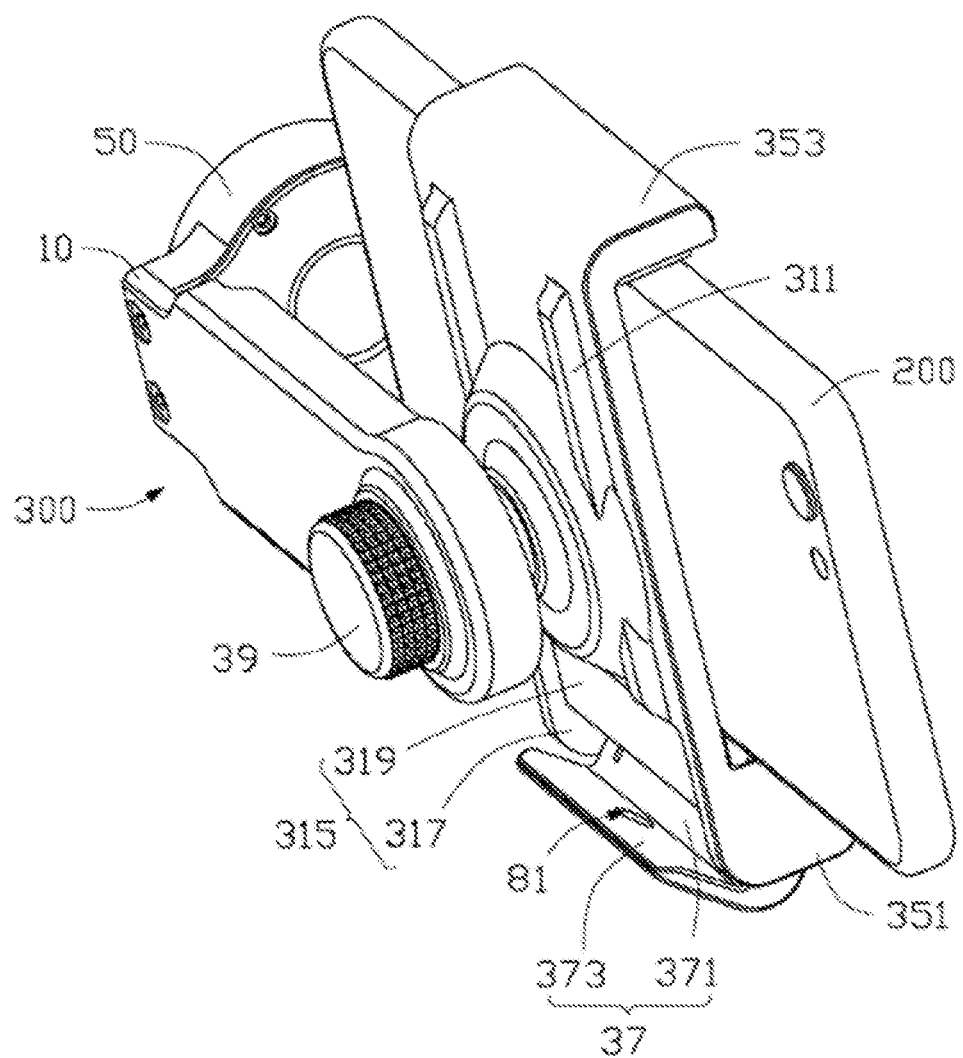
FIG. 3 is a schematic perspective view of a holding apparatus in an unlocked state according to an exemplary embodiment of the disclosure.
Figure 4:
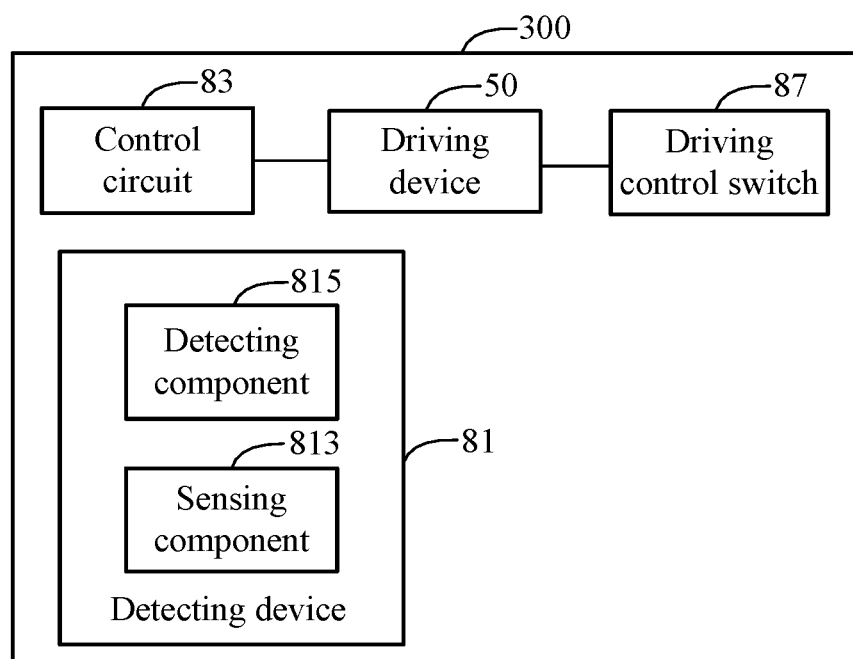
FIG. 4 is a schematic block diagram of a holding apparatus according to an exemplary embodiment of the disclosure.

As shown in FIGS. 2 to 4, the holding apparatus 300 is configured to carry an electronic device 200. In some embodiments, the electronic device 200 may be an electronic device that can take pictures, such as a mobile phone or a camera. In some other embodiments, the electronic device 200 may be an electronic book, a navigator, or the like.

The holding apparatus 300 includes a support arm 10, a support base 30 connected to the support arm 10, a driving device 50 for driving the support base 30 to move, a detecting device 81, and a control circuit 83. The support base 30 is configured to hold the electronic device 200. The detecting device 81 is coupled to the control circuit 83. The detecting device 81 is configured to detect the mounting state of the electronic device 200. The control circuit 83 receives a detection result from the detecting device 81 and controls a power output of the driving device 50 according to the detection result.

In some embodiments, the support arm 10 may have a hollow body that can accommodate cables (not shown), electronic components, and/or the like. The support base 30 is rotatably connected to an end of the support arm 10.

Figure 6:
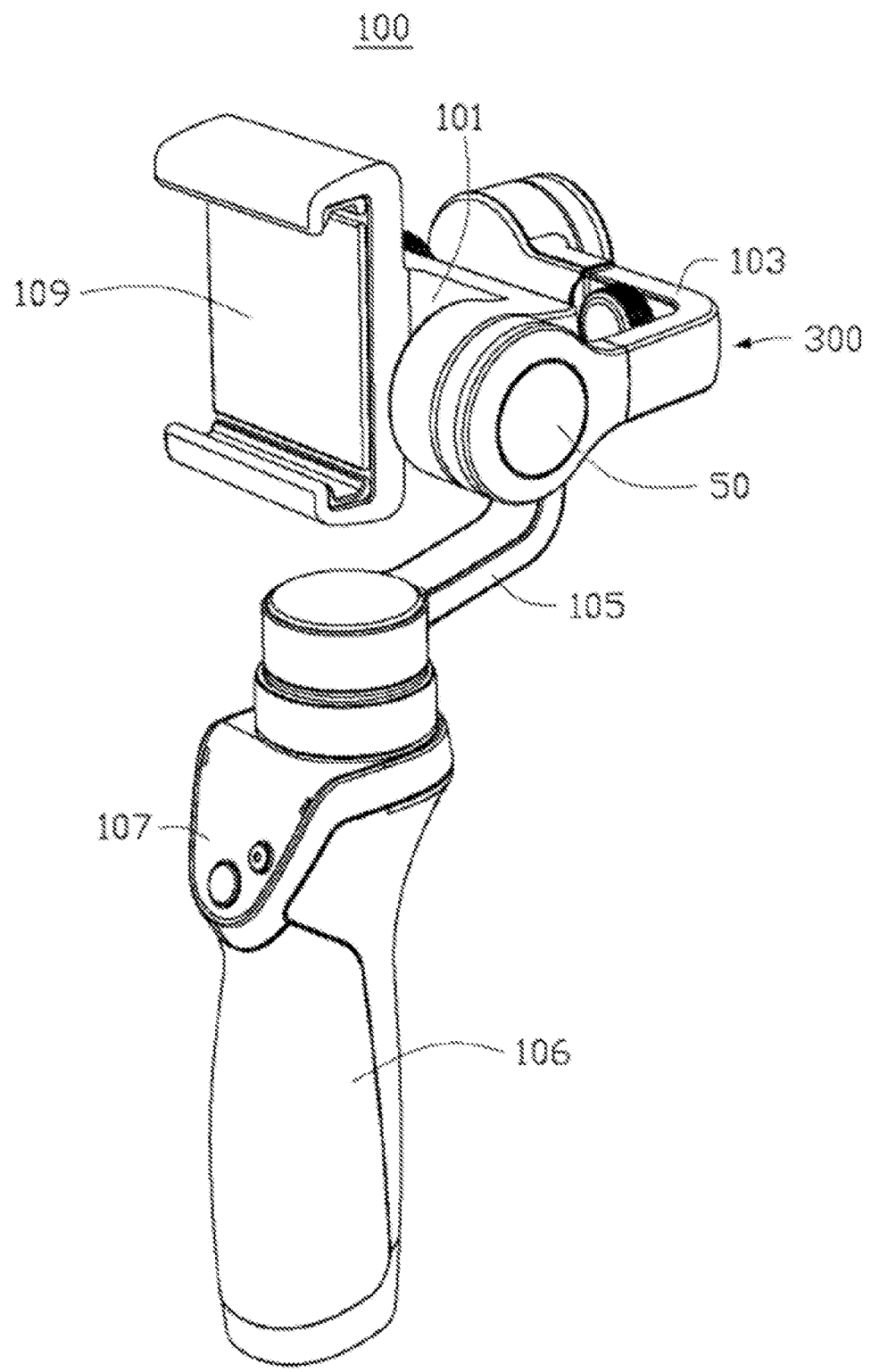
FIG. 6 is a schematic perspective view of a hand-held gimbal according to an exemplary embodiment of the disclosure.

The support base 30 includes a base body 31, two holding members 35, and a locking member 37. The base body 31 has a plate-like shape and is connected to an end of the support arm 10. A plurality of ribs 311 are formed protruding from the outer surface of a side of the base body 31 adjacent to the support arm 10 to reinforce the base body 31, thereby preventing deformation of the base body 31. As shown in FIG. 3, a receiving groove 315 is formed concaving from the side of the base body 31 adjacent to the support arm 10. The receiving groove 315 includes a bottom wall 317 and a side wall 319 connected with the bottom wall 317. The two holding members 35 are formed by bending and extending from both ends of the base body 31 to the same side for clamping the electronic device 200. The two holding members 35 include a first holding member 351 and a second holding member 353. The support base 30 includes a receiving portion 109, as shown in FIG. 6, which is formed by the base body 31 and the two holding members 35. The locking member 37 is rotatably connected with the side wall 319 of the receiving groove 315. The locking member 37 has a bend sheet-like structure, which includes a connecting portion 371 and a locking portion 373. The connecting portion 371 is rotatably connected to the side wall 319 of the receiving groove 315. The locking portion 373 is formed by bending and extending a side of the connecting portion 371. When the locking portion 373 is received in the receiving groove 315, the locking portion 373 is attached to the bottom wall 317. The locking member 37 and the first holding member 351 cooperate with each other to lock the electronic device 200 to the base body 31. As such, the holding apparatus 300 is in a locked state as shown in FIG. 2. When the locking portion 373 is detached from the bottom wall 317, the holding apparatus 300 is in an unlocked state as shown in FIG. 3, and the user can take out the electronic device 200 from the first holding member 351 and the second holding member 353.

Furthermore, the support base 30 also includes a connector 39 protruding from the base body 31. The connector 39 is configured to connect the base body 31 and an end of the support arm 10.

The driving device 50 is mounted at an end of the support arm 10 distal from the base body 31 for driving the support arm 10 and the support base 30 to drive the electronic device 200 to rotate. Herein, the driving device 50 is a motor. In some embodiments, the driving device 50 may be any component that can drive the electronic device 200 to move, and there may be more than one driving device 50 and/or more than one support arm 10.

Figure 5:
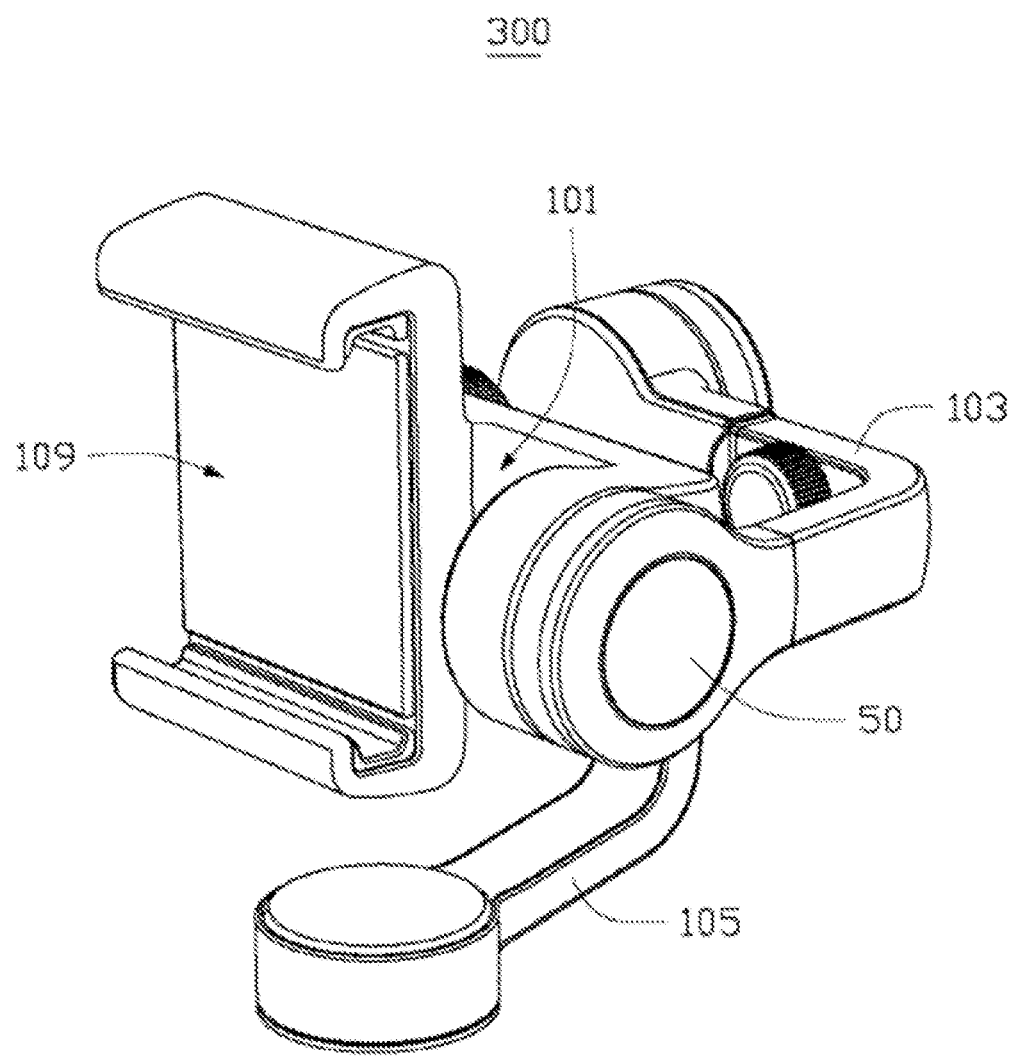
FIG. 5 is a schematic perspective view of a triaxial gimbal according to an exemplary embodiment of the disclosure.

FIG. 5 shows a triaxial gimbal as an example of the holding apparatus 300 consistent with the disclosure. As shown in FIG. 5, the holding apparatus 300 further includes a first rotation bracket 101, a second rotation bracket 103, and a third rotation bracket 105, which are sequentially and rotatably connected. For example, the first rotation bracket 101 is rotatably connected to the second rotation bracket 103 and the second rotation bracket 103 is rotatably connected to the third rotation bracket 105. In some embodiments, the first rotation bracket 101 is the support arm 10 described above and is connected to the support base 30. The holding apparatus 300 may be connected to another device via the third rotation bracket 105. The driving device 50 drives the support arm 10 and the support base 30 to drive the electronic device 200 to rotate about a pitch axis. In some embodiments, the holding apparatus 300 may further include driving devices that can rotate around other axes, e.g., a roll axis, a yaw axis. Each of the driving devices can drive a corresponding rotation bracket to rotate. In some other embodiments, the holding apparatus 300 may include one or two rotation brackets and one or two corresponding driving devices.

The detecting device 81 is provided at the support base 30 and closes to a mounting position at which the electronic device 200 is held. Herein, the detecting device 81 is arranged on a side of the locking portion 373 adjacent to the receiving groove 315 for detecting the mounting state of the electronic device 200. The control circuit 83 is electrically coupled to the driving device 50 for controlling the power output of the driving device 50 according to the detection result received from the detecting device 81. The control circuit 83 may be provided inside the support arm 10. In some embodiments, the connection between the detecting device 81 and the control circuit 83 may be an electrical connection, a wired connection, or a wireless connection.

When the detecting device 81 detects that the electronic device 200 is not mounted on the support base 30, the control circuit 83 controls the driving device 50 not to start.

After the electronic device 200 is mounted on the support base 30, the control circuit 83 receives the detection result from the detecting device 81 and starts the driving device 50.

When the detecting device 81 detects that the electronic device 200 is mounted on the support base 30 but the mounting state of the electronic device 200 is changed, for example, the electronic device 200 needs to be removed from the support base 30, the control circuit 83 may control the driving device 50 to stop the power output. In some embodiments, the change of the mounting state of the electronic device 200 may be that the electronic device 200 is removed, the position of the electronic device 200 is adjusted, or the like.

The control circuit 83 may have a preset delay time. After the electronic device 200 is mounted on the support base 30, the control circuit 83 receives the detection result and starts the driving device 50 after the preset delay time.

When the locking member 37 unlocks, the detecting device 81 may sense the change of information and the control circuit 83 may control the driving device 50 to stop the power output.

In some embodiments, the detecting device 81 is a magnetic sensor or an electromagnetic sensor. When the detecting device 81 senses that magnetic field strength is maintained at a specific value and does not change, the electronic device 200 may be determined to be unmounted. When the detecting device 81 senses that the magnetic field intensity is changed, the mounting state of the electronic device 200 may be determined to be changed. The detecting device 81 includes a sensing component 813 and a detecting component 815. The sensing component 813 is provided on the locking portion 373. The detecting component 815 is provided on the support arm 10 for detecting the magnetic induction intensity at the position thereof. When the locking member 37 moves relative to the base body 31, the position of the sensing component 813 with respect to the detecting component 815 may be changed and the detecting component 815 may detect that the magnetic induction intensity is changed, based on which the detecting component 815 may determine that the user wishes to detach or adjust the electronic device 200, i.e., the mounting state is or will be changed. Therefore, the control circuit 83 may control the driving device 50 to stop the power output. In some embodiments, the detecting component 815 may be provided on a structure of the driving device 50, the receiving portion 109, the fuselage 400, or the like, as long as the detecting component 815 can detect the magnetic induction intensity.

In some embodiments, the sensing component 813 may include a position sensor for detecting position information of the locking portion 373 relative to the base body 31 and transmitting the detection information to the detecting component 815. The detecting component 815 may pre-store reference information, which is the position information when the locking portion 373 locks to the base body 31. In some embodiments, the reference information can include the position information of the locking portion 373 with respect to the base body 31 when the locking portion 373 is attached to the bottom wall 317. The detecting component 815 may compare the detection information with the reference information. If the detection information is consistent with the reference information, the driving device 50 may continue to operate. If the detection information is not consistent with the reference position, the control circuit 83 may control the driving device 50 to stop the power output. In some embodiments, when the user is trying to detach the electronic device 200 from the holding apparatus 300, the user may pull the locking portion 373 down, such that the locking portion 373 is detached from the bottom wall 317 and the position of the locking portion 373 with respect to the base body 31 is changed. Thus, the detection information from the sensing component 813 received by the detecting component 815 is not consistent with the reference information, and the control circuit 83 controls the driving device 50 to stop the power output.

In some embodiments, the detecting device 81 may include another kind of non-contact sensor. For example, the detecting device 81 may include a photoelectric sensor, which includes a light emitting component, a light receiving component, and a detecting component. The light emitting component can be provided at the locking portion 373 and the light receiving component can be provided at the bottom wall 317. The light receiving component is configured to receive light emitted by the light emitting component. The detecting component can be provided on the support arm 10 or the support base 30 and can be coupled to the light receiving component for detecting whether the light receiving component receives the light or not. In some other embodiments, the detecting component may be provided on the driving device 50 or another structure of the UAV 500 as long as the detecting component can detect whether the light receiving component receives the light or not. When the holding apparatus 300 is in the locked state, the locking portion 373 is attached to the bottom wall 317, and the light emitting component is arranged opposite to the light receiving portion, which receives the light emitted by the light emitting component. For example, when the user is trying to detach the electronic device 200 from the holding apparatus 300, the user may pull the locking portion 373 down, such that the locking portion 373 is detached from the bottom wall 317 and the light receiving component may fail to receive the light emitted by the light emitting component. When detecting that the light receiving component does not receive the light emitted by the light emitting component, the detecting component may determine that the user is trying to detach the electronic device 200 and the control circuit 83 may control the driving device 50 to stop the power output.

In some embodiments, the detecting device 81 may include a distance sensor. When the detecting device 81 does not detect an obstacle within a preset distance, the electronic device 200 may be determined to be unmounted. When the detecting device 81 detects an obstacle within the preset distance and senses a change in the distance from the obstacle, the mounting state of electronic device 200 may be determined to be changed. The detecting device 81 can be provided on the support base 30 and the obstacle can be the electronic device 200. In some other embodiments, the detecting device 81 can be provided on the side wall 319 of the receiving groove 315 and the obstacle can be the locking portion 373.

In some embodiments, the detecting device 81 may include an optical sensor. When the detecting device 81 senses external ambient light, the electronic device 200 may be determined to be unmounted. When the detecting device 81 firstly does not sense the external ambient light and then senses the external ambient light, the mounting state of the electronic device 200 may be determined to be changed. The detecting device 81 can be provided on the locking portion 373. When the holding apparatus 300 is in the locked state, the locking portion 373 may be attached to the bottom wall 317, and the detecting device 81 cannot detect the light of the environment where the holding apparatus 300 is located. When the user is trying to detach the electronic device 200 from the holding apparatus 300, the user may pull the locking portion 373 down, such that the detecting device 81 can detect the light of the environment where the holding apparatus 300 is located and determine that the user is trying to detach the electronic device 200, i.e., the mounting state of the electronic device 200 is to be changed. Therefore, the control circuit 83 may control the driving device 50 to stop the power output. In some other embodiments, the light sensor may be provided on a side of the base body 31 away from the support arm 10. When the electronic device 200 is sandwiched between the holding devices 300, the light sensors cannot detect the light of the environment where the holding apparatus 300 is located. When the user is detaching the electronic device 200, the optical sensor may detect the light in the environment where the holding apparatus 300 is located and feed detection information back to the control circuit 83. Based on the detection information, the control circuit 83 may control the driving device 50 to stop the power output.

In some embodiments, the detecting device 81 may include a touch sensor, for example, a resistive sensor. The detecting device 81 can determine whether the mounting state of the electronic device 200 is changed according to sensed pressure information, and the control circuit 83 may control the power output of the driving device 50 according to the mounting state of the electronic device 200. In some embodiments, when the user is trying to detach the electronic device 200 from the holding apparatus 300, the user may pull the locking portion 373 down, such that a pressure is applied to the detecting device 81. The detection apparatus 81 can detect the pressure and determine the user is trying to detach the electronic device 200 according to the sensed pressure information. The control circuit 83 may control the driving device 50 to stop the power output. In some embodiments, the detecting device 81 may be arranged at a position such that the detecting device 81 can be in contact with the electronic device 200 when the electronic device 200 is mounted on the holding apparatus 300. For example, the resistive sensor may be arranged on the bottom surface of the receiving portion 109 of the support base 30.

In some embodiments, the detecting device 81 may include an infrared sensor, which may be arranged at a position of the holding apparatus 300 close to the mounting position of the electronic device 200. The locking member 37 can be omitted in this scenario.

In some embodiments, the detecting device 81 may include a transmitting component and a receiving component. The transmitting component is configured to emit infrared light, and the receiving component is configured to receive reflected infrared light.

In some embodiments, the detecting device 81 may be provided inside the receiving portion 109 of the support base 30. A slot window may be provided on the receiving portion 109, which can allow the infrared light to emit outside the receiving portion 109, such that the infrared light emitted by the detecting device 81 can be reflected by the electronic device 200. In some other embodiments, the detecting device 81 may be provided on the support arm 10. When the electronic device 200 is mounted on the holding apparatus 300, the infrared light emitted by the detecting device 81 can be reflected by the electronic device 200.

The detecting device 81 can determine whether the electronic device 200 is mounted or whether the mounting state of the electronic apparatus 200 is changed according to the intensity of the reflected infrared light. In some embodiments, when the intensity of the reflected infrared light sensed by the detecting device 81 is zero or less than a preset value, the electronic device 200 may be determined to be unmounted. When the intensity of the reflected infrared light sensed by the detecting device 81 changes, the mounting state of the electronic device 200 may be determined to be changed.

In some embodiment, the detecting device 81 may include an infrared camera, which can sense the mounting state of the electronic device 200 through image recognition. In some embodiments, the detecting device 81 may include an infrared proximity sensor, which can sense the mounting state of the electronic device 200 through infrared distance measurement. In some embodiments, whether there is an object mounted within a certain distance can be determined according to the distance to the object that can be obtained by calculating the time difference between emission and reception of the infrared light.

In some embodiments, the detecting device 81 may include one or more of a capacitive sensor, an optical sensor, a magnetic sensor, an electromagnetic sensor, an infrared sensor, an ultrasonic sensor, and a distance sensor.

Furthermore, the holding apparatus 300 also includes a driving control switch 87 coupled to the driving device 50. The driving control switch 87 is configured to manually activate the driving device 50 after the electronic device 200 is mounted on the support base 30, such that the driving device 50 can be activated even when the control circuit 83 and the detecting device 81 are abnormal. For example, the detecting device 81 sometimes may not function properly and may not detect the electronic device even after the electronic device 200 is mounted on the support base 30.

The holding apparatus 300 has at least two stable states after the electronic device 200 is mounted. In some embodiments, the holding apparatus 300 may store a preset duration of the transition from a stable state to another stable state. When the holding apparatus 300 transits from a stable state to another stable state using a duration longer than the preset duration, the control circuit 83 can control the driving device 50 to stop or reduce the power output for preventing the driving device 50 from being stalled due to unexpected conditions during rotation. The duration of the transition from a stable state to another stable state is also referred to as a "transition duration." The preset duration of the transition from a stable state to another stable state stored in the holding apparatus 300 is also referred to as a "preset transition duration." For example, when the user is trying to detach the electronic device 200 from the holding apparatus 300, the user may forget to turn off the driving device 50 in operation, such that the driving device 50 is still in a running state. Because the user needs to pull the locking member 37 down when detaching the electronic device 200 from the holding apparatus 300, the support base 30 may remain at a same position for a long time. The holding apparatus 300 may detect the time difference from a previous position of the support base 30, i.e., the previous stable state before the electronic device 200 is detached, to a position of the support base 30 when the electronic device 200 is detached, i.e., stable state when the electronic device 200 is detached, exceeds the preset transition duration. In this scenario, the control circuit 83 can control the driving device 50 to stop or reduce the power output. As another example, when the driving device 50 drives the electronic device 200 to transit from a stable state to another stable state, the transitional movement may be blocked due to an external blockage or an obstacle, resulting in failure to complete the transition from a stable state to another steady state within the preset transition duration. Therefore, the control circuit 83 can control the driving device 50 to stop or reduce the power output to prevent driving device 50 from being stalled.

The holding apparatus 300 includes at least one mode. The preset transition duration is a duration of the transition from a stable state to another stable state in a current mode. The preset transition duration may be different in different modes. After the time-out problem of the preset transition duration has been solved, a restart instruction may be sent to the control circuit 83 to recover the power output of the driving device 50.

In some embodiments, the electronic device 200 includes a photographing device. When the holding apparatus 300 is in a stable state after the electronic device 200 is mounted, the screen of the electronic device 200 and the shot sight can be in the same direction.

According to the disclosure, the holding apparatus 300, the hand-held gimbal 100, and the UAV 500 are provided with the detecting device 81 and the control circuit 83 coupled to the detecting device 81. The detecting device 81 is configured to detect the mounting state of the electronic device 200. The control circuit 83 can receive the detection result from the detecting device 81 and control the power output of the driving device 50 according to the detection result, such that the driving device 50 can be prevented from being overloaded in the process of detaching the electronic device 200, thereby prolonging the service life of the holding apparatus 300. Furthermore, the holding apparatus 300 can store a preset transition duration of the transition from a stable state to another stable state. When the holding apparatus 300 transits from a stable state to another stable state using a duration longer than the preset transition duration, the control circuit 83 can control the driving device 50 to automatically stop or reduce the power output to prevent the driving device 50 from being stalled due to unexpected conditions during operation. The service life of the driving device 50 can be extended and the reliability and convenience of the holding apparatus 300 can be improved.

FIG. 6 shows a hand-held gimbal 100 consistent with the disclosure. As shown in FIG. 6, the hand-held gimbal 100 includes the holding apparatus 300 described above and a handle 106 connected to the holding apparatus 300. In some embodiments, the handle 106 is connected to the third rotation bracket 105 of the holding apparatus 300 and a control button 107 is provided on the handle 106. The control circuit 83 may be provided at any position of the holding apparatus 300. The support base 30 forms a receiving portion 109.

The detecting device 81 may be provided inside the receiving portion 109. In some embodiments, the control button 107 may be omitted and a touch control component may be provided on the handle 106.

In some embodiments, the locking member 37 may be omitted. Based on the type of the detecting device 81, the detecting device 81 may be provided at a suitable position of the support base 30, for example, inside the receiving portion 109 formed by the base body 31 and the two holding members 35, or on the edge of one of the two holding members 35 or the base body 31.

In some embodiments, the control button 107 may also be provided on any part of the holding apparatus 300, such as the first rotation bracket 101, the second rotation bracket 103, or the third rotation bracket 105.

In some embodiments, the holding apparatus 300 may also include one or two rotation brackets.

In some embodiments, the receiving groove 315 on the base body 31 may be omitted. The locking member 37 may be rotatably connected to a side of the base body 31.

In some embodiments, the holding apparatus 300 may include one, three, or four holding members 35, as long as the electronic device 200 can be clamped.

In some embodiments, the support arm 10 may be omitted. The driving device 50 may be directly connected to the support base 30 so as to directly drive the support base 30 to move the electronic device 200. The detecting device 81 and the control circuit 83 may be provided on the support base 30 or on the driving device 50.

In some embodiments, the holding apparatus 300 may be mounted on a hand-held support device or a drone, such as a UAV, a self-drive vehicle, a driverless boat, or the like.

Figure 7:
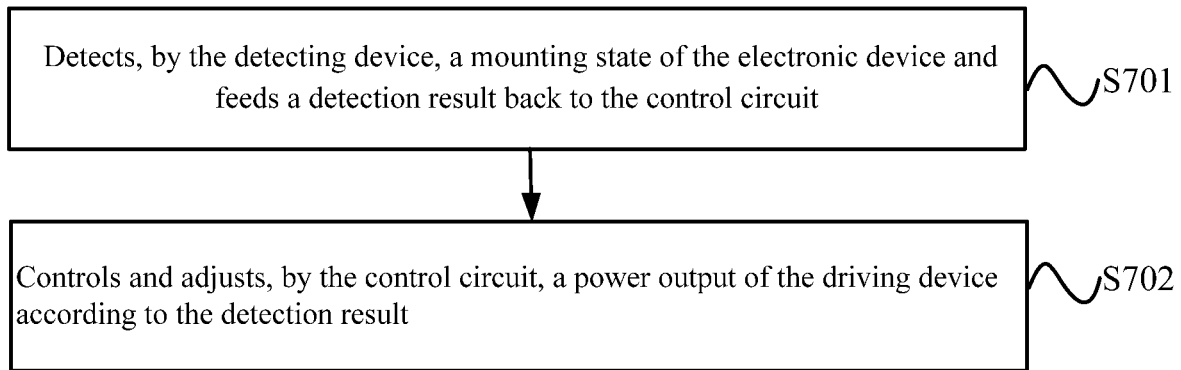
FIG. 7 is a flow chart of a method for controlling a holding apparatus according to an exemplary embodiment of the disclosure.

FIG. 7 shows a method for controlling a holding apparatus consistent with the disclosure. The holding apparatus includes a support base, a driving device for driving the support base to move, a detecting device, and a control circuit coupled to the detecting device. The support base is configured to hold an electronic device. The support base includes a base body and one or more holding members provided on the base body for clamping the electronic device.

As shown in FIG. 7, at S701, the detecting device detects a mounting state of the electronic device and feeds a detection result back to the control circuit.

At S702, the control circuit controls and adjusts a power output of the driving device according to the detection result. In some embodiments, if the detecting device detects that the electronic device is not mounted on the support base, the control circuit controls the driving device not to start. If the detecting device detects that the electronic device is mounted on the support base, the control circuit starts the driving device after receiving the detection result.

Furthermore, the control circuit may have a preset delay time. After receiving the detection result, the control circuit can start the driving device after the preset delay time.

Furthermore, after the electronic device is mounted on the support base, if the control circuit receives an instruction to start the driving device, the control circuit can control the driving device to be started.

Furthermore, if the detecting device detects that the electronic device is mounted on the support base but the mounting state of the electronic device is changed, the control circuit can control the driving device to stop the power output. For example, when the user is trying to detach the electronic device from the support base, the one or more holding members can be released. When the detecting device detects that the one or more holding members are released, the control circuit can control the driving device to stop the power output.

In some embodiments, the detecting device may include a distance sensor. When the detecting device does not detect an obstacle within a preset distance, the electronic device can be determined to be unmounted. When the detecting device detects an obstacle within the preset distance and senses a change in the distance from the obstacle, the mounting state of electronic device can be determined to be changed.

In some embodiments, the detecting device may include a magnetic sensor or an electromagnetic sensor. When the detecting device senses that magnetic field strength is maintained at a specific value and does not change, the electronic device can be determined to be unmounted. When the detecting device senses that the magnetic field intensity is changed, the mounting state of the electronic device can be determined to be changed.

In some embodiments, the detecting device may include an optical sensor. When the detecting device senses external ambient light, the electronic device can be determined to be unmounted. When the detecting device firstly does not sense the external ambient light and then senses the external ambient light, the mounting state of the electronic device can be determined to be changed.

In some embodiments, the detecting device may include an infrared sensor. When an intensity of the reflected infrared light sensed by the detecting device is zero or less than a preset value, the electronic device can be determined to be unmounted. When the intensity of the reflected infrared light sensed by the detecting device is changed, the mounting state of the electronic device can be determined to be changed.

Figure 8:
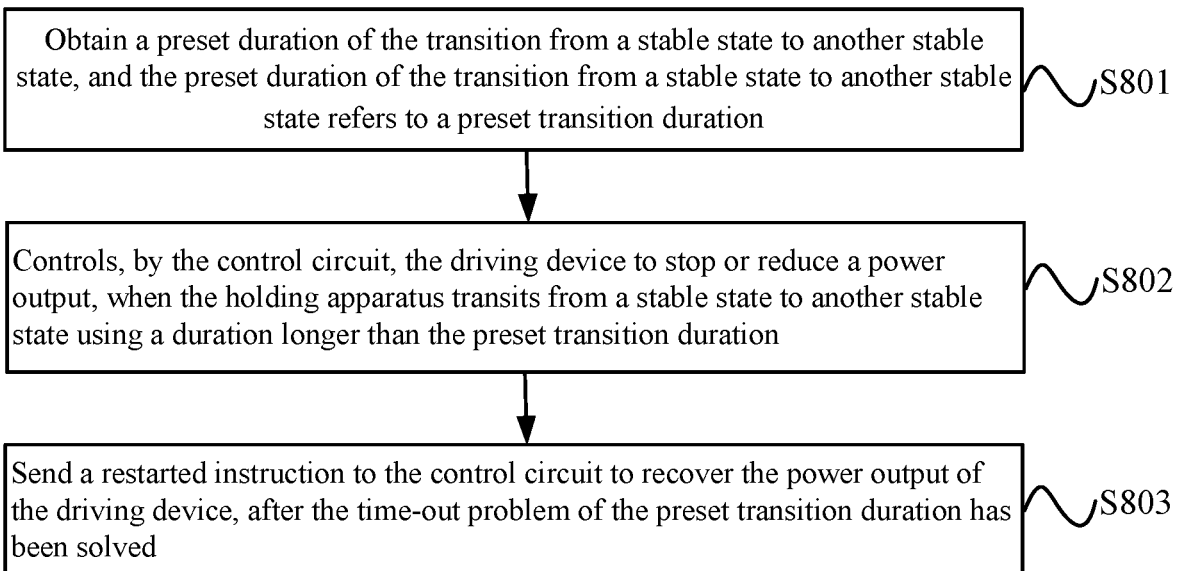
FIG. 8 is a flow chart of a method for controlling a holding apparatus according to another exemplary embodiment of the disclosure.

FIG. 8 shows another method for controlling a holding apparatus consistent with the disclosure. The holding apparatus includes a support base, a driving device for driving the support base to move, and a control circuit. The support base is configured to hold an electronic device. The holding apparatus has at least two stable states after the electronic device is mounted.

As shown in FIG. 8, at S801, a preset duration of the transition from a stable state to another stable state is obtained. The preset duration of the transition from a stable state to another stable state is referred to as a preset transition duration.

At S802, when the holding apparatus transits from a stable state to another stable state using a duration longer than the preset transition duration, the control circuit controls the driving device to stop or reduce a power output.

At S803, after the time-out problem of the preset transition duration has been solved, a restart instruction is sent to the control circuit to recover the power output of the driving device.

The holding apparatus includes at least one mode. Obtaining the preset duration of the transition from a stable state to another stable state (at S801) includes obtaining a preset duration of the transition from a stable state to another stable state in a current mode.

When the electronic device is a photographing device and the holding apparatus is in a stable state after the electronic device is mounted, the screen of the electronic device and the shot sight can be in the same direction.

In some embodiments, the process at S803 may be omitted.

A computer storage medium, such as a non-transitory computer-readable storage medium, that is consistent with the present disclosure is also provided. The computer storage medium may store program codes, which can be executed to perform a control method for holding apparatus consistent with the disclosure, such as one of the above-described exemplary methods.

The terms "and/or" is merely for illustrating the relationships between the associated objects. For example, A and/or B may represent one of three situations, i.e., A alone, both A and B, and B alone. In addition, the character "I" between two items generally indicates an "or" relationship between the associated two items.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A holding apparatus comprising:
a support base configured to hold an electronic device, the support base having a locking member configured to lock the support base to the electronic device;
a driving device configured to drive the support base;
a detecting device attached on the locking member, the detecting device including a photoelectric based non-contact sensor, configured to detect a mounting state of the electronic device; and
a control circuit coupled to the detecting device and configured to:
receive a detection result from the detecting device, and
control a power output of the driving device according to the detection result.

2. The holding apparatus of claim 1, wherein:
the control circuit is configured to control the driving device not to start, in response to detecting that the electronic device is not mounted on the support base; and
the control circuit is configured to control the driving device to stop the power output, in response to the detecting device detecting that the electronic device is mounted on the support base but the mounting state of the electronic device is changed.

3. The holding apparatus of claim 2, further comprising:
a driving control switch coupled to the driving device and configured to start the driving device in response to detecting that the electronic device is mounted on the support base.

4. The holding apparatus of claim 1, wherein:
the control circuit is further configured to start the driving device in response to receiving the detection result indicating that the electronic device is mounted on the support base.

5. The holding apparatus of claim 4, wherein:
the control circuit is further configured to start the driving device after a preset delay time, in response to receiving the detection result.

6. The holding apparatus of claim 1, wherein the support base includes:
a base body; and
a holding member provided at the base body and configured to hold the electronic device.

7. The holding apparatus of claim 6, wherein:
the support base is configured to movably connected to the base body;
the locking member is configured to be locked to the base body and cooperate with the holding member to lock the electronic device; and
the control circuit is further configured to control the driving device to stop the power output, in response to a change of detection information of the detecting device caused by the locking member being unlocked.

8. The holding apparatus of claim 7, wherein:
the detecting device includes a light emitting component attached on the locking member; a light receiving component provided at the base body and configured to receive light emitted by the light emitting component; and a detecting component coupled to the light receiving component and configured to: detect whether the light receiving component receives the light; and determine that the electronic device is being detached in response to detecting that the light receiving component does not receive the light emitted by the light emitting component; and the control circuit is further configured to control the driving device to stop the power output in response to the detecting component detecting that the light receiving component does not receive the light emitted by the light emitting component.

9. The holding apparatus of claim 1, wherein:
the detecting device is provided at the support base and close to a mounting position at which the electronic device is held; and
a receiving portion is formed by the support base; and the detecting device is provided inside the receiving portion.

10. The holding apparatus of claim 9, wherein:
the detecting device is arranged at a position, such that the detecting device is in contact with the electronic device when the electronic device is mounted on the holding apparatus.

11. The holding apparatus of claim 1, further comprising:
a support arm connected to the driving device and configured to be driven by the driving device.

12. The holding apparatus of claim 11, wherein:
the driving device is provided at an end of the support arm distal from the support base; and the support arm is fixedly connected to the support base; and
the control circuit is provided inside the support arm.

13. The holding apparatus of claim 1, wherein the detecting device includes an infrared sensor provided at a position of the holding apparatus close to a mounting position of the electronic device.

14. The holding apparatus of claim 13, wherein:
a receiving portion configured to receive the electronic device is formed by the support base; the detecting device is provided in the receiving portion; and infrared light emitted by the detecting device is reflected by the electronic device when the detecting device is provided in the receiving portion;
the holding apparatus further comprises a support arm connected to a base body of the support base, wherein: the detecting device is provided at the support arm; and infrared light emitted by the detecting device is reflected by the electronic device when the electronic device is mounted on the holding apparatus; and
the detecting device includes: a transmitting component configured to emit infrared light; and a receiving component configured to receive reflected infrared light.

15. The holding apparatus of claim 1, further comprising:
a first rotation bracket;
a second rotation bracket rotatably connected to the first rotation bracket; and
a third rotation bracket rotatably connected to the second rotation bracket;
wherein the support base is provided at an end of the first rotation bracket.

16. The holding apparatus of claim 15, wherein the holding apparatus is a triaxial gimbal.

17. A hand-held gimbal comprising:
a holding apparatus including:
a support base configured to hold an electronic device, and include a locking member configured to lock the support base to the electronic device;
a driving device configured to drive the support base;
a detecting device attached on the locking member, the detecting device including a photoelectric based non-contact sensor, configured to detect a mounting state of the electronic device;
a control circuit coupled to the detecting device and configured to receive a detection result from the detecting device, and control a power output of the driving device according to the detection result; and
a handle connected to the holding apparatus.

18. The hand-held gimbal of claim 17, wherein:
the holding apparatus further includes:
a first rotation bracket;
a second rotation bracket rotatably connected to the first rotation bracket; and
a third rotation bracket rotatably connected to the second rotation bracket;
the handle is rotatably connected to the third rotation bracket.

19. The hand-held gimbal of claim 18, wherein the handle includes a control button.

20. The holding apparatus of claim 7, wherein the detecting device includes: a position sensor provided at the locking member and configured to detect position information of the locking member relative to the base body; and a detecting component configured to: receive detection information from the position sensor; and compare the detection information with pre-stored reference information, the reference information including position information of the locking member with respect to the base body when the locking member is attached to the base body; and the control circuit is further configured to control the driving device to stop the power output, in response to the detecting component detecting that the detection information is inconsistent with the reference information.

21. The holding apparatus of claim 7, wherein the non-contact sensor is an optical sensor; when the locking member is attached to the base body and the locking member locks the base body, the detecting device is blocked from detecting light of an environment where the holding apparatus is located; and when the locking member unlocks the base body: the detecting device detects the light of the environment where the holding apparatus is located; and the control circuit is configured to control the driving device to stop the power output in response to the detecting device detecting the light of the environment.

22. The holding apparatus of claim 7, wherein the detecting device includes a resistive sensor; the detecting device is provided at the locking member; the detecting device is further configured to determine whether the mounting state of the electronic device is changed according to sensed pressure information; and the control circuit is further configured to control the power output of the driving device according to the mounting state of the electronic device.

23. The holding apparatus of claim 7, wherein the detecting device further includes: a detecting component configured to detect a change of a magnetic field intensity in response to a change of a position of the electromagnetic non-contact sensor; and the control is further configured to control the driving device to stop the power output in response to the detecting component detecting the change of the magnetic field intensity.

* * * * *